MAGNETIC RECORDING SYSTEM

Filed April 10, 1947

7 Sheets-Sheet 1

INVENTOR
Bruce Roberts
BY
Synnestvedt & Lechner
ATTORNEYS

INVENTOR
Bruce Roberts
BY Synnestvedt & Lechner
ATTORNEYS

Sept. 29, 1953 B. ROBERTS 2,653,819

MAGNETIC RECORDING SYSTEM

Filed April 10, 1947 7 Sheets-Sheet 3

INVENTOR
Bruce Roberts
BY
Synnestvedt & Lechner
ATTORNEYS

Sept. 29, 1953 B. ROBERTS 2,653,819

MAGNETIC RECORDING SYSTEM

Filed April 10, 1947 7 Sheets-Sheet 4

INVENTOR
Bruce Roberts
BY
Symmestvedt & Lechner
ATTORNEYS

Sept. 29, 1953 B. ROBERTS 2,653,819

MAGNETIC RECORDING SYSTEM

Filed April 10, 1947

7 Sheets-Sheet 5

INVENTOR
Bruce Roberts
BY
Synnestvedt & Lechner
ATTORNEYS

Sept. 29, 1953 B. ROBERTS 2,653,819

MAGNETIC RECORDING SYSTEM

Filed April 10, 1947

7 Sheets-Sheet 6

INVENTOR
Bruce Roberts
BY
Symmestvedt & Lechner
ATTORNEYS

Sept. 29, 1953

B. ROBERTS 2,653,819

MAGNETIC RECORDING SYSTEM

Filed April 10, 1947

7 Sheets-Sheet 7

INVENTOR

Bruce Roberts

BY

ATTORNEYS

Patented Sept. 29, 1953 2,653,819

UNITED STATES PATENT OFFICE 2,653,819

MAGNETIC RECORDING SYSTEM

Bruce Roberts, Philadelphia, Pa., assignor to The International Electronics Company, Philadelphia, Pa., a corporation of Pennsylvania Application April 10, 1947, Serial No. 740,653

8 Claims. (Cl. 274—4)

This invention relates to a system of recording and reproducing intelligence which employs as a recording medium a normally flat rectangular record which is adapted to be flexed to cylindrical form during recording and reproduction.

The present application is concerned with certain broad aspects of the invention of which some embodiments are disclosed in my copending application, Serial Number 717,754, filed December 21, 1946, of which this application is a continuation-in-part. As disclosed in said application, according to the invention, a flat, rectilinear sheet of flexible material carrying a magnetizable substance is temporarily flexed to the form of a closed loop, preferably to the form of a cylinder, with one of the edges overlapping the opposite edge, thus providing what may be termed a continuous recording surface, which may be scanned in a continuous path or record track intersecting the line of contact of the two edges.

The invention is particularly adapted for use with record sheets whose resilience may vary from the limpness of tissue paper to the relative stiffness of a resin or composition sheet, for example, that of photographic film.

An object of the invention is to record intelligence magnetically in a continuous track on a flat rectangular record sheet which has been temporarily flexed to cylindrical form, and subsequently to reproduce the intelligence so recorded, notwithstanding the fact that the record sheet may, in the interim, have been restored to flat form, folded or creased.

A further object of the invention is to scan a helical track intersecting an edge of a record sheet which has been flexed to cylindrical form and to index the sheet on the form in order to provide for reregistration of the sheet on reinsertion in the same or a similar apparatus.

The invention also contemplates mounting a record on the record support in a manner to establish a driving connection between the support and the record sheet; to provide for reestablishing, upon reinsertion of a sheet in the machine, the alignment between the overlapped edges of the sheet which existed at the time of the recording; and to provide for reestablishment of the original relationship between a recorded track on the sheet and the reproducing head.

The invention, while adapted to the recording of intelligence of widely different forms, is especially adapted for use in recording and reproducing office dictation, in that it provides for very simple loading and unloading of record sheets, while preserving accuracy of alignment even with the limpest record sheets contemplated for use with the invention.

How these objects and others which will appear are attained may be more clearly understood upon reference to the three forms of apparatus described below and disclosed in the drawings, in which.

All three of the forms of apparatus which are about to be described are adapted for use in recording and reproducing intelligence on flexible, rectangular record sheets carrying magnetizable material.

Such sheets comprise finely divided particles of magnetic material having high magnetic retentivity and high coercive force, dispersed in a non-magnetic binder, and preferably supported by a non-magnetic backing member.

While it is possible to record intelligence magnetically on a record medium comprising a homogeneous mass of magnetic material, it has been found that the desirable magnetic properties above enumerated are invariably accompanied in homogeneous sheets by undesirable physical properties. Magnetic materials having the requisite coercive force and retentivity tend to be so brittle and hard that it is difficult to work them by rolling or drawing, and, on the other hand, materials which are susceptible to fabrication tend to have inadequate retentivity and coercive force. Furthermore, even if record media are fabricated of materials having suitable magnetic characteristics, the physical properties of records so made are undesirable for the purposes contemplated herein. For example, a record sheet of carbon steel having only moderate retentivity and coercive force is still so brittle that attempts to fold it inevitably result in breaking the record.

Practical considerations of reasonable duration of a record within a limited physical size require that the sheet be scanned at a relatively low translational speed. As the scanning speed decreases, the output voltage of the reproducing head also decreases, since the voltage is proportional to the rate of change of the magnetic field. As a result, lower scanning speeds require more amplification and hence render the equipment more sensitive to extraneous noise. Indeed, attempts to employ a homogenous sheet flexed to cylindrical form with opposite edges overlapped result in a particularly objectionable disturbance, in the nature of a click or plop, every time the overlapped edges pass the reproducing head. This phenomenon is apparently due to the concentration of the magnetic lines of force along the edge of the homogeneous metal sheet.

Figure 2:
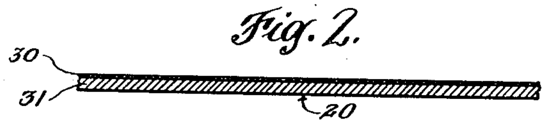
Figure 2 is a fragmentary sectional view of a record sheet.

In contrast, records of the type shown in section in Figure 2, comprising finely divided particles of magnetic material dispersed in a flexible, non-magnetic binder, may be produced economically, and are resistant to a remarkable degree to the most severe treatment. Sheets of this character may be folded, creased, wrinkled, and otherwise distorted without interfering with their magnetic properties and without destroying or appreciably affecting in any way the quality of reproduction of a recording thereon.

Since the magnetic particles in sheets of the type described are effectively isolated, no concentration of the lines of force occurs at the edge of the sheet, with the result that the plop or click which is characteristic of a homogeneous sheet is completely obviated, despite the low speed and consequent high amplification employed in the practice of the invention.

However, it should be pointed out that sheets having dispersed magnetizable particles present certain problems which must be overcome if they are to be used as recording media. Primarily, the same flexibility and immunity to ill effects from distortion require novel handling techniques to reestablish the relative alignment of the portions of a record recorded on a sheet. Principal among these characteristics is the "limpness" of record sheets of the type under discussion. When it is realized that the sheets have a thickness of from 1 to 5 thousandths of an inch and an appearance and "feel" approximately equal to that of ordinary carbon paper, some appreciation of the problems involved will be realized.

Figure 1:
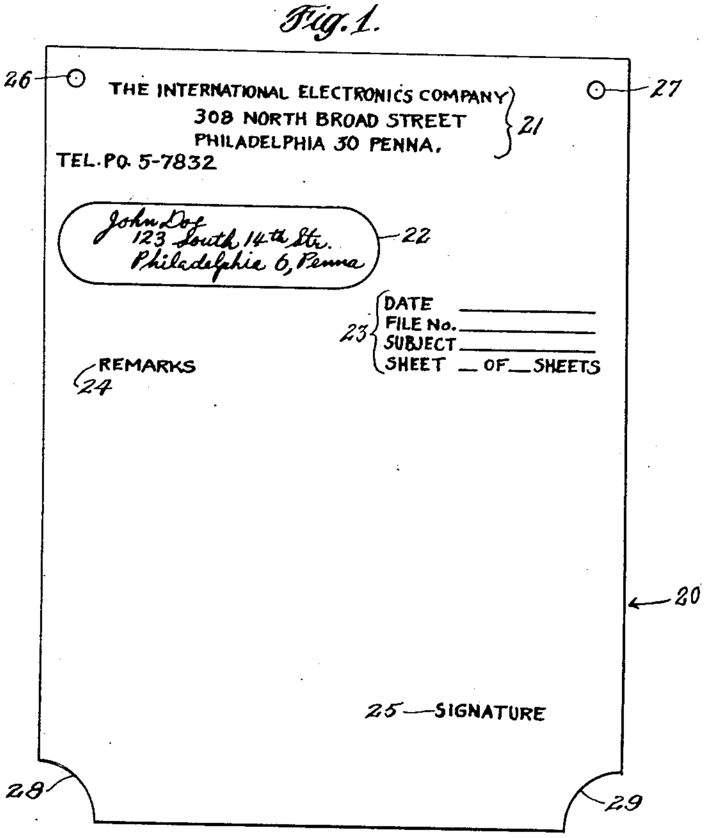
Figure 1 is a plan view of a record sheet adapted for use with the apparatus of the invention.

In Figure 1, I have illustrated in plan a record sheet 20 adapted for use in recording office correspondence, it being contemplated that records made in accordance with this aspect of the invention may be employed either as intermediaries between dictation and transcription of a letter, for example, to typewritten form, or may constitute the final form of letter to be transmitted to the recipient by mail and there reproduced by him in reproducing equipment of the type disclosed. The sheet bears on its uncoated side a letterhead 21, space for address 22, classification indicia 23, a heading 24, and signature location indicia 25.

The record sheet may be of any convenient size, depending on the nature and type of intelligence to be recorded, but preferably, for office dictation work, as illustrated in Figure 1, the sheet should be of standard letter size, for example, 8½" by 11". By standardizing on this size and shape of record sheet, all the auxiliary equipment of letter communication becomes available. For example, folded and creased sheets may be mailed in standard envelopes, and may be filed in either flat or folded form in standard file folders, standard file cabinets, and the like.

In addition to the dimensions, the plan form of the sheet is characterized by holes 26 and 27 and notched corners 28 and 29, which together cooperate in maintaining the record sheet in scanning position in my novel recording apparatus. In addition, the holes provide a means for distinguishing one end of the sheet from the other, as will appear more fully hereinbelow. As shown in the sectional view of Figure 2, the sheet 20 comprises a flexible layer 30, comprising magnetizable particles, preferably supported by a flexible backing 31. The magnetizable material is preferably a material having a high magnetic retentivity and high coercive force, for example, Alnico-5, dispersed in a flexible non-magnetic binder, for example, a resin such as "Vinylite," a sheet of which is capable of being employed in the apparatus of the invention even without a backing member. The backing member 31, if one is employed, may advantageously be paper or some other material having the characteristics of great resistance to cracking upon folding and creasing and the ability to assume a substantially flat form after flexure to a closed loop, or after creasing. The binder for the magnetizable particles has similar properties, and therefore a record medium made in accordance with the invention is capable of repeated flexing to cylindrical form and of repeated creasing and uncreasing without disturbance of the bond between the magnetizable material and the backing member and without interference with the orientation of the individual magnetizable particles in relation to each other. The resilience of the material operates to restore it to flat form as it is released from the cylinder, which is not only advantageous for purposes of ultimate disposition, but also aids in removing the sheet from the machine, as will appear.

I have found that the best combination of the properties above discussed is obtained with a sheet of from about 1 to about 5 thousandths of an inch in thickness, and most desirably, with sheets from 2 to 3 thousandths of an inch thick.

Certain features of the recording sheet described above are fully disclosed and claimed in my copending application Serial No. 737,693, filed March 27, 1947, and entitled Magnetic Letterhead.

Figure 3:
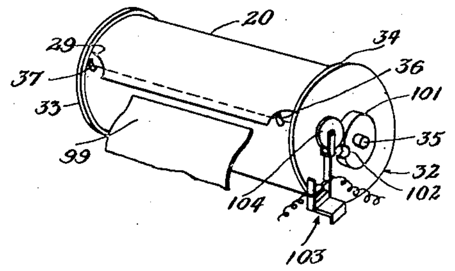
Figure 3 is a perspective view of the sheet of Figure 1 mounted upon the record support of the first form of the machine.

During recording and reproduction, a sheet 20 is supported upon a cylindrical form generally indicated at 32 in Figure 3. Cylinder 32 comprises a barrel of non-magnetic material, for example, brass, and two annular end flanges 33 and 34. Cylindrical form 32 is adapted to be mounted by means of a shaft 35 which protrudes beyond flanges 33 and 34 at either end.

Form 32 is provided with a pair of hooks 36 and 37 projecting from the barrel of the cylinder near the ends thereof in the same radial plane and adapted to engage the holes 26 and 27 in sheet 20. As may be seen, the hooks are inclined in the direction of normal rotation of the form, which inclination facilitates both engagement and disengagement of a sheet, as will appear.

The circumference of the barrel should be no greater than the length of sheet 20 and preferably the circumference should be somewhat less than the length of the sheet in order to provide for a slight overlap when the sheet is wrapped around the barrel, as shown in Figure 3. In dictation machines which are standardized on the basis of 8½″ by 11″ paper, the circumference of the cylinder is approximately 10½″. Under these circumstances, notches 28 and 29 permit the paper to lie flat without interference from hooks 36 and 37, even though the notched or bottom end of the sheet overlaps the opposite end. The length of the cylinder between the flanges is precisely equal to the width of the paper—desirably 8½″.

Figure 4:
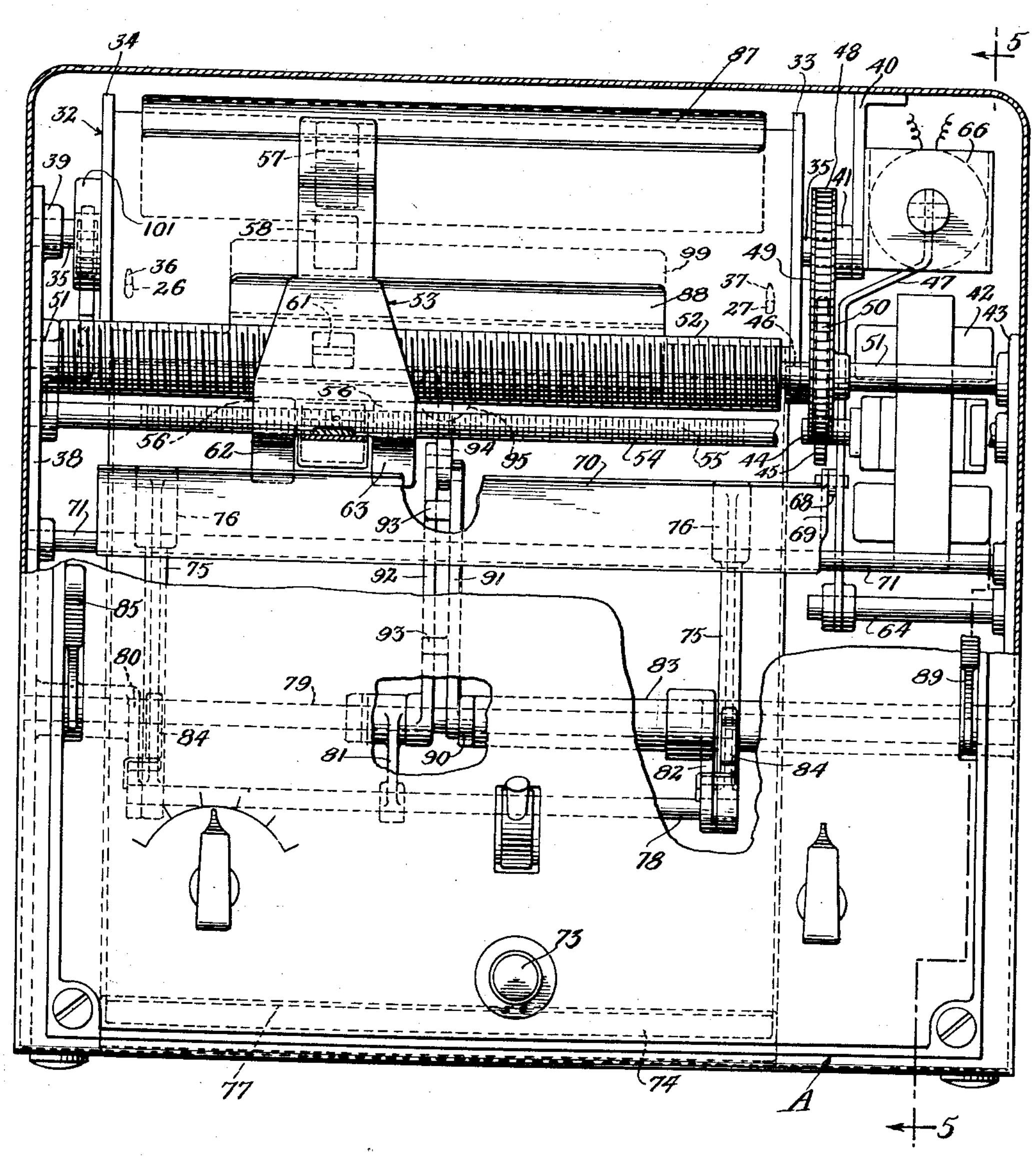
Figure 4 is a front elevation of the first form of machine with most of the front panel broken away.
Figure 5:
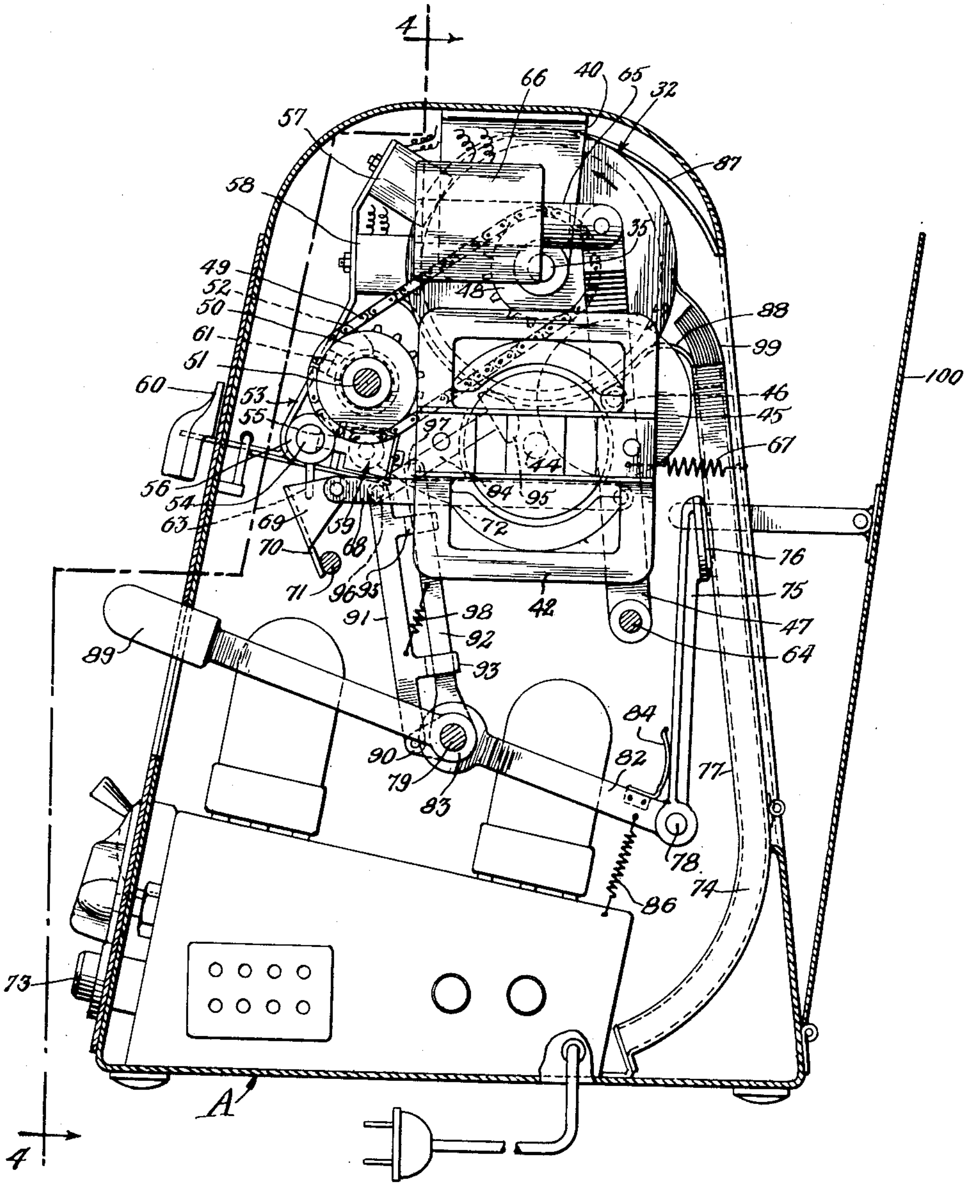
Figure 5 is a sectional view of the machine of Figure 4 taken along the line 5—5 of Figure 4.

In the first form of the machine, designated as "A" in Figures 4 and 5, cylindrical form 32 is mounted for rotation in the upper portion of the cabinet. The left end of shaft 35 (see Figure 4) is journalled for rotation in side frame 38 and a pad 39 formed integrally therewith. The opposite or right end of shaft 35 is journalled in bracket 40 and pad 41.

Immediately below shaft 35 and to the right of drum 32 may be seen driving motor 42 mounted on side frame 43. Motor shaft 44 is in peripheral engagement with drive puck 45 (see Figures 6 and 7) which is mounted for rotation with a shaft 46, which shaft is journalled in shift arm 47. The operation of arm 47 will be described more fully hereinbelow, but it should be observed at this time that motion of arm 47 is adapted to carry puck 45 into and out of engagement with motor shaft 44 and to carry puck shaft 46 into and out of engagement with flange 33 of form 32, thus providing a selectively engageable drive from motor 42 to form 32.

In addition to cylinder 32, shaft 35 also carries for rotation therewith a driving sprocket 48, located on the shaft between flange 33 and pad 41. Sprocket 48 carries a chain 49, which is in engagement with driven sprocket 50, of the same diameter as sprocket 48, secured to shaft 51 of lead screw 52, which has a single thread. Lead screw shaft 51 is journalled at its left end in side frame 38 and at the opposite end in side frame 43.

It will thus be seen that the drive train for all movable parts is: motor shaft 44, movable puck 45, puck shaft 46, flange 33, shaft 35, sprocket 48, chain 49, sprocket 50, shaft 51 and lead screw 52.

Lead screw 52 provides translational force for effecting movement of a portion of the mechanism axially of cylindrical form 32. This portion is mounted on a carriage 53, which is supported by and free for axial and rotational movement upon axial way 54 having a rack 55 cut along one side thereof. The actual bearing surfaces upon which the carriage rides are the internal surfaces of a pair of sleeves 56. Mounted on carriage 53 are erase head 57, recording head 58, back spacing mechanism generally indicated at 59, pointer 60, half nut 61, and a pair of tabs 62 and 63. According to the invention, the mass of carriage 53 and its associated parts is distributed around axial way 54 in a manner to retain heads 57 and 58 against the barrel of cylindrical form 32 and to retain half nut 61 in engagement with lead screw 52 by gravity. Tabs 62 and 63, which extend below axial way 54 provide levers to which torque moments may be applied to remove the heads from the cylinder and the half nut from the lead screw, as will appear more fully hereinbelow.

Figure 6:
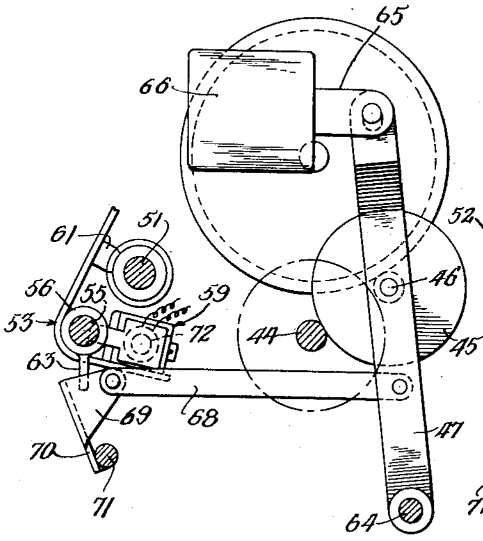
Figure 6 is a view of a portion of the mechanism of Figure 5.
Figure 7:
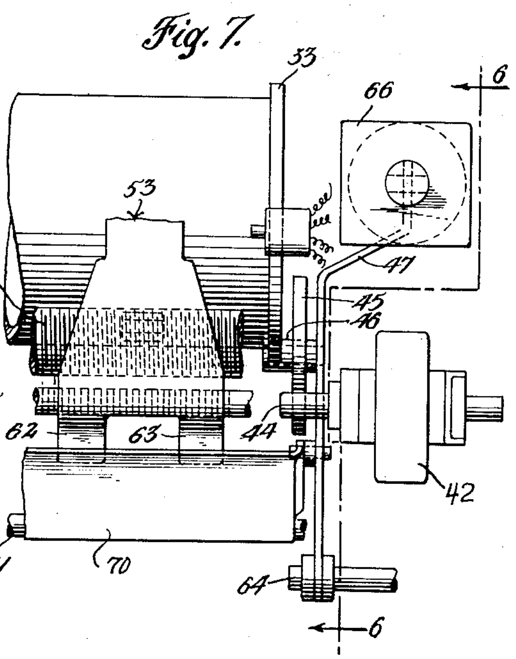
Figure 7 is a view of a portion of the mechanism as disclosed in Figure 4.

Both the rotational drive train and the oscillation of carriage 53 about axial way 54 are controlled by a single electromechanical control system which is clearly illustrated in Figures 6 and 7. Shift arm 47 is mounted for swing motion at its lower extremity on shaft 64, which provides a reaction point for the arm. At its upper end arm 47 is connected with armature 65 of solenoid 66, and intermediate its ends arm 47 carries puck shaft 46, discussed above, a spring 67 (see Figure 5), and cross arm 68.

Spring 67 normally tends to pull arm 47 toward the rear of the machine but exerts less force on the arm than does solenoid 66 when it is energized, with the result that the arm is held in its rearward position unless the solenoid is energized, under which condition it is pulled forward.

The front end of cross arm 68 is connected to tab 69 of trip bar 70, which is capable of rocking motion on shaft 71. As may be seen in Figure 4, trip bar 70 extends practically the full length of axial way 54, so that regardless of the position of carriage 53, trip bar 70 may be brought into position against tabs 62 and 63 of carriage 53. Figures 5 and 6 show the parts in the position they assume when solenoid 66 is energized—that is, with drive puck 45 in driving position and trip bar 70 rocked forward, permitting the recording heads 57 and 58 to contact sheet 20 on cylinder 32 and permitting half nut 61 to engage with lead screw 52. Under these conditions the cylinder rotates and the carriage is moved axially of the cylinder by the lead screw. Now, if the circuit to solenoid 66 be broken, spring 67 will pull arm 47 rearwardly, disengaging the drive puck and rocking trip bar 70 to the rear. The trip bar, as will be seen, comes in contact with one or both of tabs 62 and 63, exerting a torque moment on carriage 53 around axial way 54, thus lifting the heads from the sheet and removing half nut 61 from engagement with lead screw 52.

The combination of the rotating-scanning component effected by rotation of cylinder 32 and the translating component effected by translational movement of carriage 53 on axial way 54, provides means for effecting movement of the recording head relative to the recording medium in two directions substantially normal to each other. The interrelation of these two components makes possible the scanning of the entire record area in a series of side-by-side track portions. Preferably, the two components are interrelated in a manner to provide for simultaneous translational and rotational movement, whereby to provide for a continuous helical track intersecting the line of overlapping of the opposite edges of the record sheet.

A second control system 59 is carried by carriage 53 and serves to effect back spacing. This mechanism is shown and described in detail in my copending application Serial No. 717,754, above identified, and also in my copending application, Serial Number 737,694, entitled Back Spacing Device for Dictating Machines, filed March 27, 1947, now Patent No. 2,581,499, issued January 8, 1952. As therein described, this mechanism includes a solenoid 72 and a pawl actuated thereby adapted to engage with rack 55 on axial way 54 to provide for step-by-step back spacing of carriage 53 on axial way 54. In Figure 4 is disclosed a push button switch 73 for controlling solenoid 72.

The record sheet loading mechanism includes a reservoir 74 in the back of the machine, adapted to contain a number of sheets 20 oriented with their leading edges, as indicated by the holes, toward the cylinder. A pair of paper fingers 75, having pads 76, is adapted to engage the forward sheet 20 in reservoir 74 through slots in the forward wall 77 of the reservoir. Fingers 75 are secured at their lower ends to a shaft 78, which is hung from a second shaft 79 by three arms, 80, 81 and 82. Arms 80 and 81 are secured to shaft 79 for rotation therewith, while arm 82 is loosely mounted for rotation on a sleeve 83 concentric with shaft 79. Each finger 75 is provided with a spring 84 which acts to force finger 75 against the paper. Rotation of shaft 79 is effected by moving lever 85 (see Figure 4). As will be seen, depressing lever 85 forces finger 75 upwardly against the tension of spring 86 (see Figure 5), and since pads 76 are coated to provide more friction between them and the sheet of paper 20 they contact than exists between that sheet and the adjacent sheet, the sheet is raised to a position where its upper edge enters the space between paper guide 87 and drum 32. As the cylinder rotates, hooks 36 and 37, which are inclined forwardly in the direction of normal rotation of cylinder 32, enter holes 26 and 27 in sheet 20, drawing the sheet from the reservoir and wrapping it around the cylinder. Paper guides 87 and 88 maintain the sheet in its flexed form on cylinder 32.

The paper ejection mechanism includes sleeve 83, above referred to, rotatably mounted on shaft 79, and which is secured at one end to lever 89 (see Figure 4) and at the other to a crank 90 carrying a link 91. Adjacent link 91 is link 92, loosely mounted for rotation on shaft 79. Links 91 and 92 are kept in substantial axial alignment by pairs of loose fitting guides 93 formed on link 91. An ejection lever 94, carrying a pad 95, is secured to links 91 and 92 at 96 and 97 respectively. When lever 89 is depressed, crank 90 rotates in a manner to shift link 91 downwardly relative to link 92 against the tension of spring 98, raising pad 95 and moving it into engagement with drum 32 through a slot in paper guide 88. When the pad can no longer swing upwardly, the whole assembly, consisting of crank 90, links 91 and 92, lever 94 and pad 95, will pivot about shaft 79, spinning drum 32 in a reverse direction (clockwise as viewed in Figure 5). Since the paper 20 on drum 32 has a natural tendency to straighten out, the sheet will be stripped off by outside back wall 99 of reservoir 74 and be deposited between wall 99 and adjustable back panel 100. The inclination of the hooks in the direction of normal rotation facilitates disengagement of the sheet from the cylinder.

In Figures 3 and 4 I have illustrated mechanism for stopping the drum in a predetermined position prior to operating the ejection mechanism, in order to insure that the trailing edge of sheet 20 will be in the proper angular position in relation to back wall 99 of magazine 74. This mechanism (see Figure 3) includes a cam 101, mounted on drum shaft 35 adjacent one end of drum 32. Cam 101 has a circular profile interrupted by a depression 102. Switch 103 includes a rotating cam follower 104, adapted to separate the switch contacts when it drops into depression 102. Switch 103, together with an ejection push button, serves to provide a path for energizing current for cylinder drive engaging solenoid 66. This circuit is completely independent of the normal operating circuit for solenoid 66, as will appear below in the description of the corresponding circuit of the B form of the invention. When it is desired to eject a sheet, the ejection switch is closed by the operator and solenoid 66 will be energized so long as cam follower 104 is in contact with the high portion of cam 101. As a result, the cylinder will rotate in the normal direction until follower 104 drops into depression 102, separating the switch contacts and deenergizing solenoid 66. The cylinder, therefore, will stop in a position determined by the angular location of the depression. This angular position is arranged to correspond with a position of the trailing edge of sheet 20 appropriate to ejection in the desired direction. Preferably, as in the form illustrated, the depression is arranged to stop the cylinder when the trailing edge of sheet 20 is somewhat past the edge of rear wall 99 of the paper magazine, which strips the sheet from the drum on reverse rotation thereof. Once the drum has been rotated to and stopped in this position, the paper is ejected by operation of lever 89, as described above.

Figure 8:
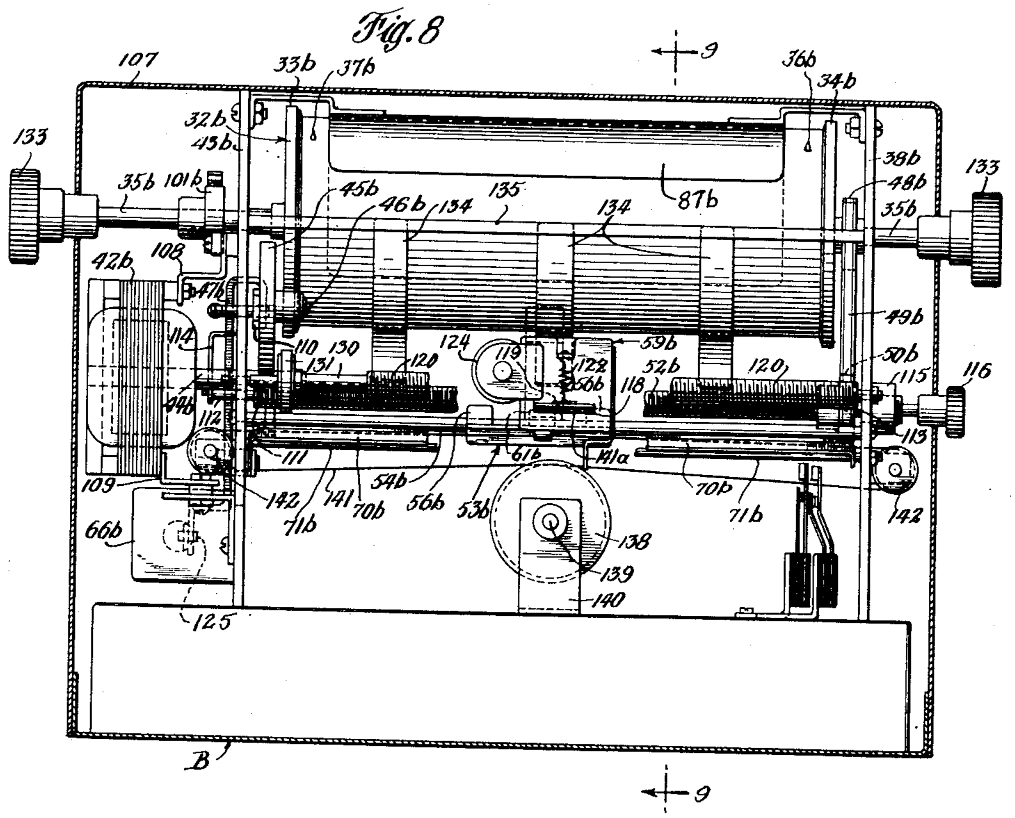
Figure 8 is an elevation of the second form of machine with the front of the case removed.
Figure 9:
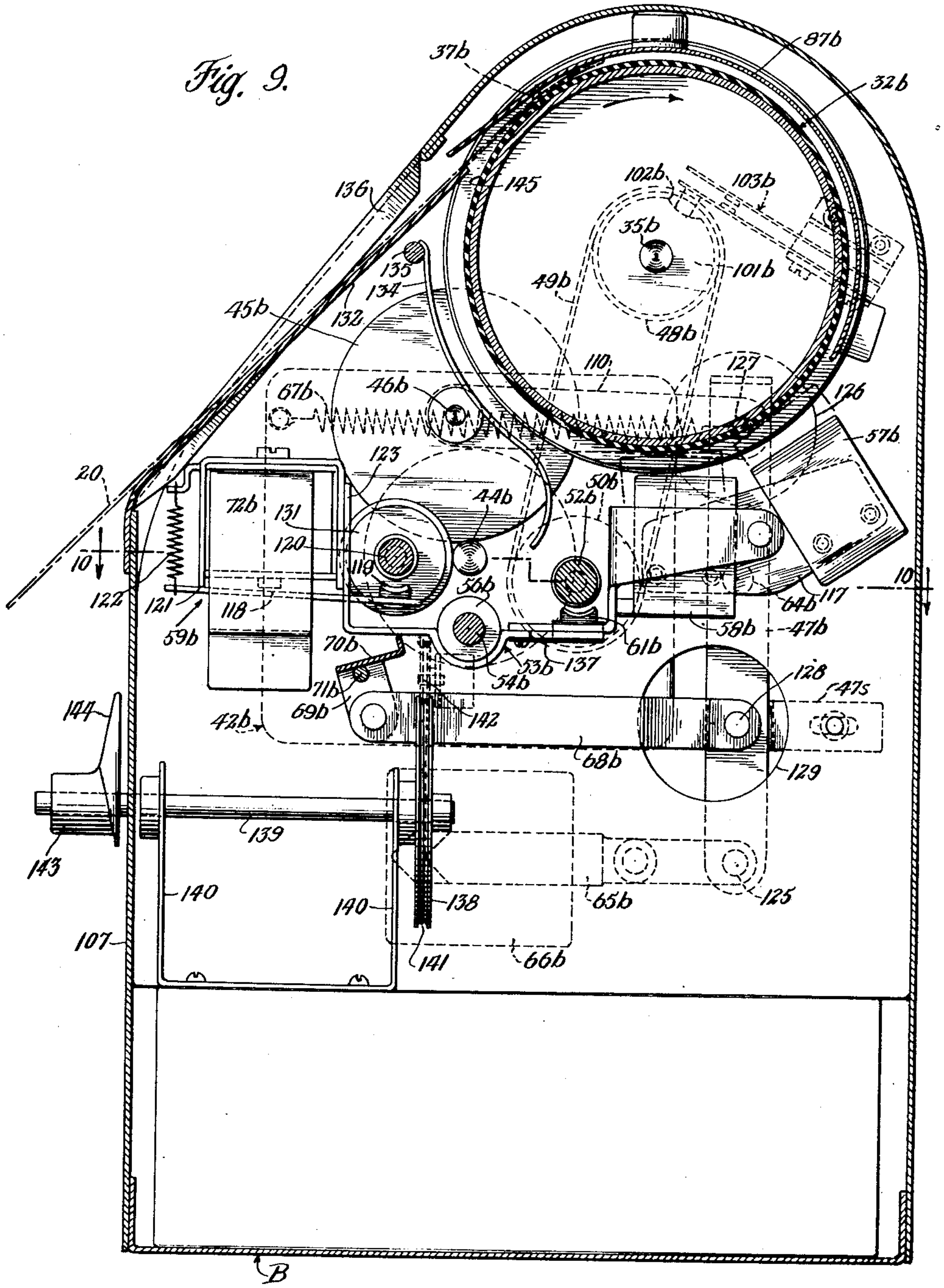
Figure 9 is a sectional view on an enlarged scale of the machine of Figure 8 taken along the line 9—9.

Turning now to the second form of machine indicated at "B" in Figures 8 and 9, it will be seen that a cylindrical form 32*b* is mounted for rotation in the upper portion of a cabinet 107. Form 32*b* is carried on a shaft 35*b* which is journalled for rotation in frames 43*b* and 38*b* at the left and right respectively. Immediately below shaft 35*b* and to the left of drum 32*b* may be seen driving motor 42*b* secured to frame 43*b* by means of brackets 108 and 109. As may be seen in Figure 9, motor shaft 44*b* is in peripheral engagement with drive puck 45*b* which is mounted for rotation with a shaft 46*b*, which shaft is journalled in a transverse shift arm 110. Motion of arm 110 is adapted to carry puck shaft 46*b* into and out of engagement with flange 33*b* of form 32*b*, thus providing a selectively engageable drive from motor 42*b* to form 32*b*.

Figure 10:
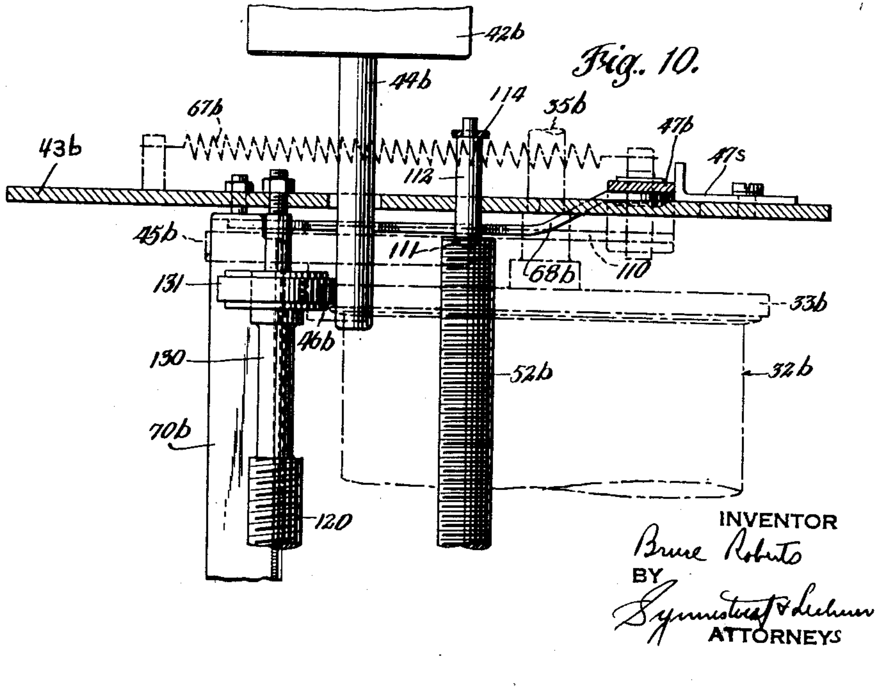
Figure 10 is a plan section of a portion of the mechanism disclosed in Figure 9 taken along the line 10—10.

Shaft 35*b* also carries for rotation therewith a driving sprocket 48*b*, located on the right end of the shaft between flange 34*b* and frame member 38*b*. Sprocket 48*b* carries a chain 49*b* which is in engagement with a driven sprocket 50*b*, secured to lead screw 52*b*. Each end of lead screw 52*b* is provided with a conical depression 111 (see Figure 10) adapted to cooperate with a pair of pointed pins 112 and 113. Pin 112 is biased towards lead screw 52*b* by a spring 114. Pin 113, which engages depression 111 at the right end of lead screw 52*b*, is threaded in a fixed nut 115 and adapted to be rotated by a knob 116. Rotation of pin 113 in nut 115 results in axial movement of the pin in relation to the fixed elements of the machine, and thus provides for axial adjustment of the position of lead screw 52*b*.

Lead screw 52b provides translational force for carriage 53b, which is supported upon axial way 54b with freedom for axial movement and also for oscillation thereon. The actual bearing surfaces upon which the carriage rides are the internal surfaces of a pair of sleeves 56b. Carriage 53b carries an erase head 57b, and a recording head 58b, supported by an equalizer arm 117. Carriage 53b is also provided with a half nut 61b adapted to engage with lead screw 52b, and in addition carries backspacing means generally indicated at 59b comprising a solenoid 72b, and armature 118 carrying a half nut 119, which is adapted to engage with reverse lead screw 120. Armature 118 is arranged with freedom for oscillation in a vertical plane about an edge 121, but is normally biased away from solenoid 72b by a spring 122. Armature 118 is held as against movement transverse the axis of solenoid 72b by virtue of the fact that it penetrates a vertical slot in solenoid support member 123. As may be seen, therefore, energization of solenoid 72b lifts armature 118, bringing half nut 119 into engagement with reverse lead screw 120, thus effecting back spacing of carriage 53b on axial way 54b. It should also be noted at this time that the head assembly, comprising heads 57b and 58b, on the one hand and the back space assembly on the other form a lever having axial way 54b as a fulcrum. The back space end of the lever (the left end as viewed in Figure 9) also includes a counterweight 124 which may be seen in Figure 8. The mass of the counterweight and back space mechanism, together, is sufficient to raise heads 57b and 58b into engagement with a record sheet supported on record support 32b.

The position of oscillation of carriage 53b about axial way 54b, as well as the position of engagement of drive puck 45b, is determined by a control system which will now be described. Referring first to Figure 8, it will be seen that in the space between frame member 43b and the end of cabinet 107 is mounted a solenoid 66b, having armature 65b (see Figure 9) pivotally connected to a shift arm 47b by a pin 125. Arm 47b is mounted for oscillation about pin 64b. At its upper end arm 47b has a double bend (see Figure 8), the horizontal portion of which penetrates an aperture 126 in frame 43b and whose reverse portion is connected to cross arm 110 by a pin 127. Intermediate mounting pin 64b and pin 125, shift arm 47b is also connected to cross arm 68b by a pin 128. Cross arm 68b penetrates an aperture 129 in frame 43b and is connected at its opposite end to crank 69b of shift bar 70b. Shift bar 70b extends the full length of axial way 54b and is mounted for oscillation on a shaft 71b. Shift bar 70b is of L section, the short arm of the L being adapted to raise the front arm of carriage 53b, whatever the position of the carriage on axial way 54b. A spring 67b biases shift arm 47b in a manner to maintain the parts in the position indicated in Figure 9, that is, with drive puck 45b out of engagement with drum 32b and with the short arm of shift bar 70b raised to a position in which half nut 61b is lowered out of engagement with forward lead screw 52b. Upon energization of solenoid 66b, however, shift arm 47b oscillates on pivot 64b against the tension of spring 67b, pulling drive puck 45b (by means of cross arm 110) into engagement with form 32b, and also rocks shift bar 70b on shaft 71b in a manner to permit the front of carriage 53b to drop and thus bring half nut 61b into engagement with lead screw 52b. The rotating and translating components of the scanning movement, therefore, are both controlled by operation of solenoid 66b. A permanent adjustment of the clearances in the control system may be made by locking adjustable stop member 47s (see Figures 9 and 10) in a position to limit the oscillation of shift arm 47b in the disengaging sense.

Back spacing is accomplished by energization of solenoid 72b, which brings half nut 119 into engagement with reverse lead screw 120, as described above. Lead screw 120 is mounted on a shaft 130, which shaft is journalled in frames 43b and 38b. In addition to reverse lead screw 120, shaft 130 also carries reverse puck 131, which is in constant engagement with motor shaft 44b and which, therefore, provides for constant rotation of reverse lead screw 120.

Cabinet 107, which is of generally rectangular plan, has a sloping front surface. The inclined front portion of the machine is depressed to form a panel 132 of the same width as a record sheet, that is, about 8½''. Panel 132 forms the bottom of a feed channel whose sides are defined by guide lips 136 projecting inwardly in the planes of flanges 33b and 34b of form 32b. To load the machine, a sheet 20 is laid against panel 132 with its top edge toward the cylinder and slid upwardly, being guided by lips 136 into engagement with cylinder 32b. Since panel 132 is parallel to a plane containing the axis of cylinder 32b, the sheet is fed onto the cylinder with its leading edge parallel to the axis. Concurrently, drum 32b is rotated by means of one of the knobs 133 or by energizing solenoid 66b until hooks 36b and 37b penetrate holes 26 and 27 in sheet 20, whereupon the sheet is drawn around the drum between upper guide member 87b and the drum, and is wrapped therearound. In addition to upper guide 87b, I have provided three spaced guides 134, in the lower front quadrant, supported by transverse element 135. As the sheet rotates, the trailing edge, after it clears heads 57b and 58b, tends to drop to a tangent position below the drum,. and it is the purpose of guides 134 to prevent the sheet from trailing into the mechanism below. As the trailing edge comes back into contact with drum 32b, tapered flanges 33b and 34b realign it with the leading edge. Once the sheet has been wrapped on the drum as above described, scanning of the sheet may be commenced by energizing solenoid 66b, which initiates rotation of the cylinder and forward motion lead screw, and engagement of the forward motion half nut as above described.

It should be pointed out at this time that drum 32b is provided with a cushion 145 of resilient material such as rubber, that half nut 61b on carriage 53b is yieldingly pressed against lead screw 52b by a spring 137, and that heads 57b and 58b are free for movement toward and away from the drum, so that the contact between the heads and a record sheet mounted on the drum may be maintained at constant pressure. When an inequality such as the line of overlapping of the two ends of a sheet, or an eccentricity of form 32b, approaches a head, the head in question may rock back relative to the other head and the entire carriage 53b may rock to a lesser extent about axial way 54b, all without interfering with the intimacy of contact of half nut 61b with lead screw 52b, since spring 137 maintains half nut 61b in contact with the lead screw despite minor variations in the relative positions of the lead screw and the carriage.

Although the cylinder and head mounting of the A machine disclosed in Figures 4 and 5 may be employed with the B machine, there are certain advantages in employing the cylinder and head mounting illustrated in Figures 8 and 9, the head mounting being fully disclosed and claimed in copending application of Chester C. Pond, entitled "Equalizer for Supporting Magnetic Recording and Erasing Heads," Serial Number 743,806, filed April 25, 1947, now Patent No. 2,530,029, issued November 14, 1950.

In Figures 8 and 9 may be seen the mechanism which performs the function of indicating the extent of recording and which also provides for rapid shifting of carriage 53b on axial way 54b. This mechanism includes a capstan 138, having a shaft 139, which shaft penetrates the front of cabinet 107 and is supported by and journalled in a bracket 140. Wound around capstan 138 is a cord 141, which runs from the capstan toward the right to an idler pulley 142, thence to a point of attachment 141a on carriage 53b then to a second idler 142 at the left of the machine, and thence back to capstan 138. Shaft 139 is provided with a knob 143 having a pointer 144. During operation of the machine, as carriage 53b progresses along axial way 54b, cord 141 rotates capstan 138, shaft 139 and knob and pointer 143 and 144, thus giving an indication of the position of the carriage along axial way 54b. In addition, knob 143 provides a means for rapidly shifting the position of carriage 53b when desired, for example, when back spacing, or when returning the carriage preparatory to scanning a new record.

Figure 11:
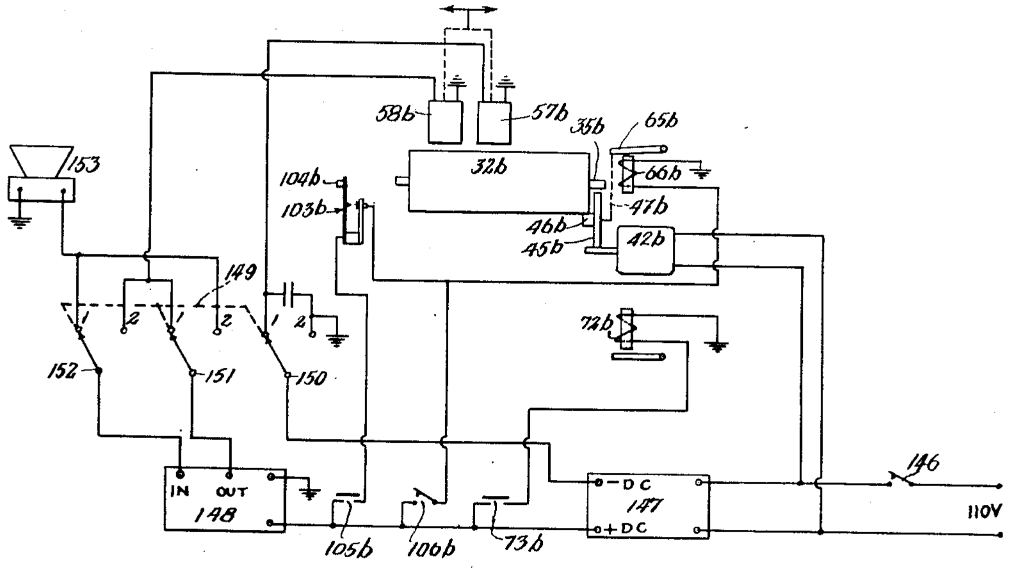
Figure 11 is a simplified wiring diagram applicable particularly to the second form of the machine, but also adapted to be employed with any of the forms of the machine.

As may be seen in Figure 9, I have provided a cam 101b and switch 103b, similar in arrangement to the automatic stop mechanism fully described in connection with the A form of the invention. Figure 11 discloses the circuit for this stop mechanism, as well as other control and voice circuits contemplated by the invention.

In Figure 11 may be seen a main power switch 146, which serves to energize motor 42b and rectifier unit 147. Rectifier unit 147 not only supplies direct current for operation of solenoids 66b and 72b, but also provides plate and filament current for an amplifier 148. The negative direct current lead from rectifier 147 is connected through section 150 of gang switch 149, either directly to ground or to ground through erase head 57b. Thus, when switch 149 is in position 1, the direct current path to all of the components from rectifier 147 includes section 150 of switch 149 and erase head 57b.

Sections 151 and 152 of switch 149 serve to connect speaker-microphone 153 and record-reproduce head 58b alternatively to the input and output of amplifier 148. Thus, in position 1 of switch 149, speaker-microphone 153 is connected to the amplifier input, record-reproduce head 58b is connected to the amplifier output, and erase head 57b is energized by virtue of the fact that the negative direct current supply is completed therethrough. When switch 149 is shifted to position 2, the record-reproduce head 58b is connected to the amplifier input, speaker-microphone 153 is connected to the amplifier output, and the negative direct current connection from rectifier 147 is made directly to ground. It will be seen, therefore, that position 1 of switch 149 corresponds to recording conditions and position 2 corresponds to reproducing conditions.

Switch 106b, which may advantageously be a foot switch, when closed energizes solenoid 66b, commencing scanning of a record on form 32b. Push button switch 73b controls the operation of reverse solenoid 72b, and push button switch 105b controls the drum orientation mechanism described above by energizing solenoid 66b through switch 103b independently of the main operating switch 106b. While I have disclosed, in my copending application, Serial Number 717,754, above identified, a complete circuit diagram for the A form of the invention, the invention also contemplates that the circuit of Figure 11 may be employed with all of the forms herein disclosed.

Figures 12, 13, 14:
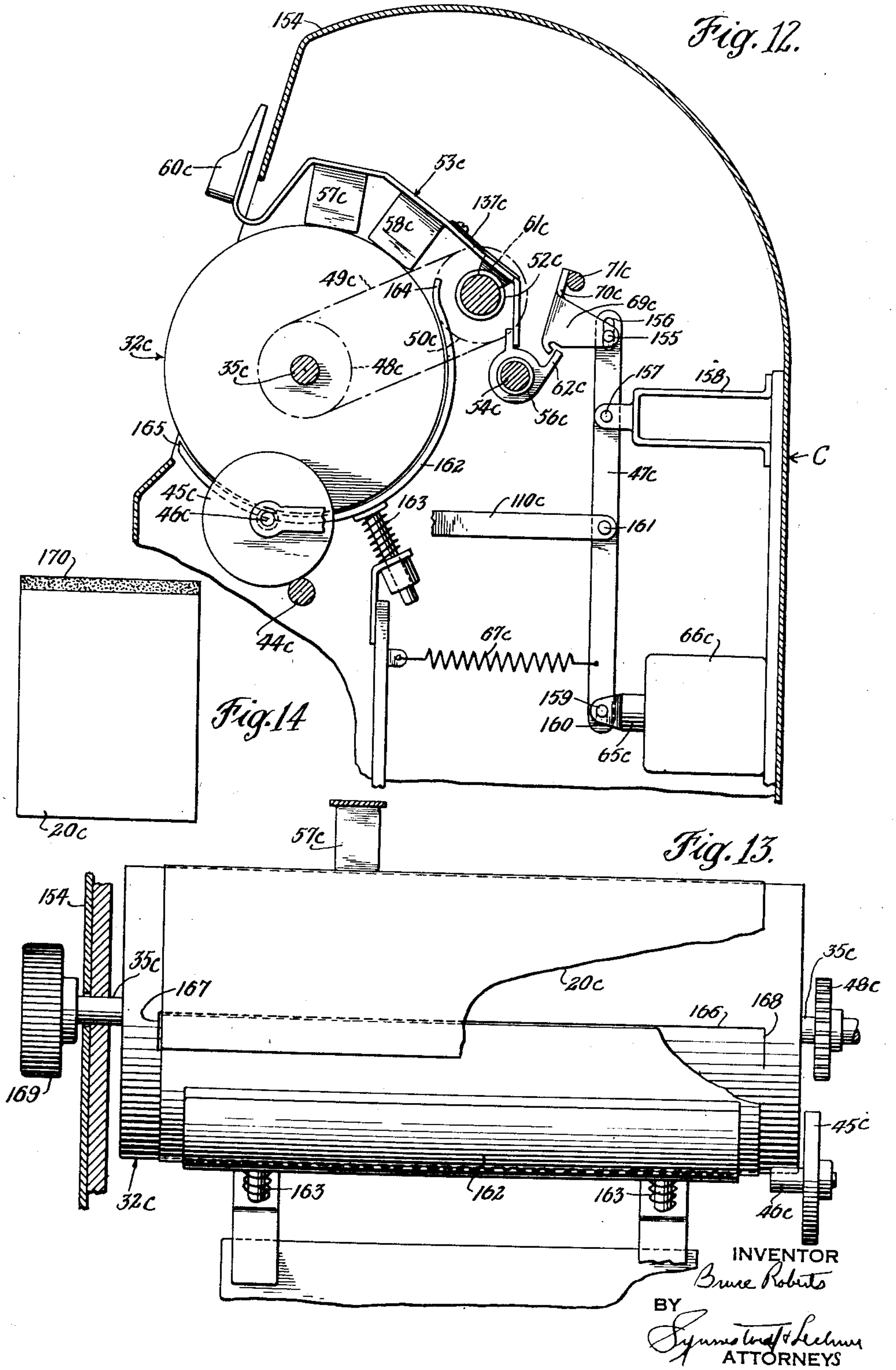
Figure 12 is a vertical sectional view of a third form.
Figure 13 is an elevation of portions of the machine of Figure 12.
Figure 14 is a plan view on a reduced scale of a record sheet particularly adapted for use with machines of the third form.

Turning now to the form of the invention illustrated at "C" in Figure 12, it will be seen that this machine is housed in a cabinet 154 in a manner to partially expose drum 32c. Drum 32c is mounted for rotation on a shaft 35c, which shaft is journalled in the side panels of cabinet 154. Shaft 35c carries at its right hand end for rotation therewith a drive sprocket 48c having a chain 49c in engagement therewith, which chain also engages a driven sprocket 50c, drivably associated with a lead screw 52c. Lead screw 52c is mounted for axial adjustment relative to cylinder 32c in the same manner as is lead screw 52b in the B form of the invention, above described.

An axial way 54c extends parallel to the axis of cylindrical form 32c and carries thereon a carriage 53c. Mounted on carriage 53c are erase head 57c, record-reproduce head 58c, a half nut 61c, yieldingly held against lead screw 52c by a spring 137c, and a pointer 60c adapted to traverse a scale on the outside of cabinet 154. Pointer 60c also provides means for manually adjusting the position of carriage 53c axially of form 32c.

Carriage 53c also comprises a sleeve 56c having a tab 62c adapted to be engaged by shift bar 70c, which bar is mounted for oscillation with shaft 71c. Shift bar 70c is provided with a crank 69c which is connected to the upper end of shift arm 47c by a pin 155, which engages a slot 156 in arm 47c. Arm 47c is mounted for oscillation on a pin 157 supported by a standard 158 and is connected at its lower extremity to armature 65c of solenoid 66c by a pin 159, penetrating a slot 160 in arm 47c. Intermediate pins 157 and 159, shift arm 47c is pivotally connected to a cross arm 110c by a pin 161. Journalled in the opposite end of cross arm 110c is a shaft 46c, carrying drive puck 45c, which is in constant peripheral engagement with shaft 44c of a driving motor, not shown. Shift arm 47c is biased by a spring 67c, anchored to a fixed bracket, which spring normally tends to hold shaft 46c of driving puck 45c out of engagement with drum 32c and also imposes a torque moment on tab 62c of carriage 53c in a sense to disengage heads 57c and 58c from drum 32c and half nut 61c from lead screw 52c. Energization of solenoid 66c, however, shifts arm 47c in a sense to driveably engage shaft 46c of puck 45c with drum 32c, and throws shift bar 70c out of engagement with tab 62c, permitting heads 57c and 58c to engage drum 32c and half nut 61c to engage lead screw 52c, all by gravity.

The machine is provided with a guide 162, which is yieldingly pressed against drum 32c by springs 163. Guide 162 extends axially of drum 32c and is provided at one edge with a lip 164 to adapt it to receive the leading edge of a record sheet supported on drum 32c and at the opposite edge with a stripper blade 165 adapted to assist in removing a sheet from the drum on reverse rotation thereof, as will appear.

Turning now to Figure 13, it will be seen that drum 32c is provided with an index line 166, extending axially of the drum to provide for peripheral registration of the leading edge of a record sheet 20c and also with a pair of index lines 167 and 168, extending circumferentially of drum 32c to provide for axial registration. A knob 169, keyed to shaft 35c, provides for manual rotation thereof and hence of drum 32c.

This form of machine is adapted for use with record sheets of the type disclosed at 20c in Figure 14. This sheet is characterized by the magnetizable coating discussed above in connection with sheet 20, and also, on the reverse side, by a strip of pressure-sensitive adhesive material 170, which is adapted to removably secure a sheet 20c to drum 32c. The presence of the adhesive also serves to identify the top of the sheet. In operation, the drum 32c is manually rotated to a position in which index lines 166, 167 and 168 are exposed, whereupon a sheet 20c is placed in contact with the drum with its leading edge in alignment with index line 166 and the adjoining edges in alignment with index lines 167 and 168. Pressure is then applied with the finger to secure the leading edge of the sheet to the drum in that position, whereupon rotation of the drum is effected by means of knob 169 until sheet 20c is wrapped around drum 32c with its trailing edge lapped over the leading edge, after which scanning is commenced by energizing solenoid 66c, which, as described above, initiates rotation of drum 32c and translational movement of carriage 53c.

Back spacing of carriage 53c is effected by grasping pointer 60c with the fingers and moving carriage 53c on axial way 54c. To remove the sheet, drum 32c is rotated in a forward direction until the trailing edge of the sheet is in an exposed position, whereupon the drum is rotated in a reverse direction by means of knob 169. The trailing edge of the sheet, since it has a natural tendency to straighten out, separates somewhat from drum 32c and is engaged by stripper edge 165 of guide 162. The trailing edge of the sheet may then be seized with the fingers, and by concurrent tension on the sheet and rotation of drum 32c, the adhesive joint between the sheet and the drum will be brought into contact with edge 165, which will effect separation of the sheet and drum, thus freeing the sheet. When it is desired to reproduce a record made in accordance with the above procedure, the sheet is again carefully registered relative to lines 166, 167 and 168, and the loading procedure repeated, upon which the sheet will be restored to the position it occupied during recording.

Each form of the invention, above described, provides means for positioning a previously recorded sheet in the apparatus in a manner to permit reproduction of the intelligence recorded thereon without regard to the intervening history of the sheet.

Such positioning involves first, establishing a driving connection between the record support and the record sheet; second, reestablishing the alignment between the overlapped edges of the sheet which existed at the time of recording; and third, providing for reestablishment of the original relationship between a recorded track on the sheet and the reproducing head.

In the A and B forms of the machine, the driving connection between the drum and the sheet is achieved through the interengagement of the hooks on the drum and the corresponding holes in the sheet. This arrangement not only provides for securing the leading portion of the sheet to the drum, but also positions the sheet accurately both peripherally and axially of the drum, which is of importance for the reasons set out below.

In the C form of the invention, the connection between the record support and the record sheet is achieved through the use of an adhesive deposited on the reverse side of the leading portion of the record sheet. In this form of the invention, the axial and peripheral position of the sheet is determined by indexing the sheet relative to index lines formed on the drum.

When a helical track is recorded on a sheet mounted on the support in the manner described, each turn of the helix is intersected by the line of overlapping. Upon reinsertion of a sheet in the machine after removal, the trailing portion of each turn must be accurately aligned with its corresponding leading portion. According to the invention, this is accomplished primarily by registering the sheet on the drum with one axis (that is, with the leading edge) parallel to the axis of the support. Since the trailing edge is parallel to the leading edge, when the sheet is wrapped upon the support and assumes the form of a cylinder of uniform length (determined by the width of the sheet) the trailing edge falls into a position of alignment with the leading edge. This result is enhanced by the action of the head and guide elements which "wipe" the trailing edge into its position relative to the leading edge even after creasing of a sheet.

In addition, the flanges on the drums of the A and B machine aid in aligning the sheet axially of the cylinder throughout its length. The tapered characteristic of the flanges of the B machine (which may also be used in the A machine) are particularly effective in guiding the sheet onto the surface of the drum, engaging both layers of the sheet in the area of overlapping, and thus accurately maintaining the axial adjustment of one layer relative to the other.

The reestablishment of the alignment between a record track and the recording-reproducing head is accomplished in the A and B machines by the mechanical indexing action of the end flanges, which, together with the fact that the lead screw and drum are effectively keyed together by the lead screw drive chain, means that whatever the relative rotational position of the drum when a sheet has been reinserted, the head elements will be in scanning contact with a track previously recorded. By accurately positioning the sheet axially of the cylinder by reference to the index lines in the C form of the machine, the same result is accomplished. In addition, I have provided in the B and C machines, mechanism, applicable to all forms, for effecting axial adjustment of the lead screw relative to the record support. By manipulation of the lead screw adjustment knob, it is possible to "tune in" a record track which is not in accurate alignment with the reproducing head. This is useful in any of the machines when extremely adverse weather conditions may have affected the physical dimensions of the sheet, and is also of great value in the C form of the machine, since it obviates the necessity of extreme accuracy in indexing the sheet both axially and peripherally of the record support. By "tuning in" is meant the operation which consists of inserting a recorded sheet into the machine, adjusting the machine for reproduction, and then manipulating the lead screw adjustment knob for maximum volume. It is contemplated that the factory alignment of the device will include an adjustment of the axial position of the lead screw, as above described, to compensate for the collective manufacturing clearances in the record translating mechanism.

Another general consideration which is met by all forms of the invention is the matter of accommodating, between the head elements and the drum, the leading edge of a sheet upon insertion, the overlapped edges of the sheet and other inequalities in the effective radius of the recording surface.

In the A form of the machine, the entire carriage is free for oscillatory movement about the axial way, the heads being maintained in contact with a record on the support by gravity, with freedom for what is effectively radial movement toward and away from the cylindrical record surface. When the leading edge of a sheet being inserted penetrates the nip between the support and the pole pieces, the head and carriage are slightly displaced to accommodate it. Similarly, the carriage rocks each time the overlapped portions of the sheet pass under the recording heads. The heads and carriage are also free to oscillate on the axial way as a result of any eccentricity in the record support itself. In the B form of the machine, in addition to the freedom for oscillatory movement of the carriage about the axial way, above described, the heads have freedom for differential movement by virtue of their mounting upon an equalizer arm. The amount of movement required to accommodate, for example, an edge of the sheet, is less than in the case of the A machine by virtue of the fact that the record support in the B machine includes a cushion of resilient material which may be depressed to a greater or lesser extent, depending upon the local pressure of contact between the record sheet and the surface of the cushion.

As was pointed out in the descriptive portion of this specification, motion of the carriage of the B form about the axial way may take place without effect upon the interengagement of the forward motion lead screw and its cooperating half nut, by virtue of the resilient mounting of the half nut, which tends to keep it in engagement with the lead screw irrespective of minor variations of position of the carriage relative to the lead screw. In the C form of the machine, the entire carriage is again free for movement about the axial way and the half nut here is also spring pressed against the lead screw to render it independent of small variations of position of the carriage.

It should be noted at this time that all of the machines are arranged to provide for scanning of a record track across the line of overlapping in a direction from the upper layer to the lower layer. Since the upper layer is therefore under tension, there is no possibility of entanglement of an edge with the heads as would be the case were rotation effected in the opposite direction, that is, with the upper layer the leading edge. As a consequence of scanning the sheet in this direction, it is possible to bias the heads against the record with sufficient pressure to maintain an intimacy of contact adequate for faithful reproduction. In all of the forms of the machine disclosed herein, the heads are maintained against the record surface by gravity. The cushion illustrated in the B form of the invention aids in preserving this intimacy of contact by permitting a slight distortion of the record surface in the immediate vicinity of the pole pieces, thus permitting contact throughout an area rather than in a single point or line as would be the case if the recording surface is absolutely unyielding. Of course the record sheets themselves, thin as they are, afford some cushioning effect.

It will also be noted that in each of the machines illustrated I have disclosed non-rotating guide elements for maintaining the record sheet in substantial contact with the record support, at least throughout a portion of the circumference of the support. These guides, which may be, as in the A and B machines, fixed at some little distance from the support, or, as in the C machine, spring-held against the support, not only serve to prevent the trailing edge of the sheet from becoming entangled with other parts of the apparatus, but also assist in "ironing out" wrinkles and creases in the sheet which, in turn, insures accurate peripheral alignment of the overlapping portions of the sheet. They also assist in reestablishing axial alignment of the overlapping portions of the sheet by forcing the sheet to conform to the cylindrical surface of the support and thus to assume a shape congruent to the support and, therefore, to assume the same position whenever again reintroduced into the machine.

In the A form of the invention, I have provided means for feeding sheets from a first station comprising a reservoir to a position of engagement with the support, to guide the sheet while on the support, and finally, to guide the sheet from the support to a second reservoir upon completion of scanning. It will thus be seen that the invention contemplates guiding sheets not only while on the record support, but also to the record support and from the record support. In the B form of the invention, the record guide path is defined in part by elements formed integrally with the case, which elements not only constitute a feed path to the machine, but also define the path of a record being ejected from the machine.

In the C form of the invention, I have illustrated a mechanism in which the feeding of a record to the support is effected manually, the registration being accomplished by visual means, as described above. However, the C form does include, as do all the others, means for engaging the trailing edge of the record sheet upon reverse rotation of the record support. This is especially desirable when employing sheets which are adhesively secured to the record support, since the stripper assists in disengaging and separating the adhering portions of the record sheet and support.

In all forms of the invention, the stripper plate assists in deflecting the trailing edge of the sheet away from the support upon reverse rotation thereof, and in the A and B forms assists in clearing the sheet of the hooks, whose inclination in the direction of normal rotation automatically brings about disengagement upon continued rotation of the support past the radial position in which the record sheet is engaged by the stripper plate.

The operating potentialities of the invention may best be appreciated upon consideration of a brief description of certain aspects of operation. The initial installation of any of the forms of the invention herein disclosed involves no more than locating the equipment at a point convenient to the person who is to operate it, connecting it to a source of electrical current, plugging in a speaker-microphone, and a foot switch for controlling the drive-energizing solenoid. With the A form of the invention, a stack of unrecorded record sheets is inserted in the record magazine with their head ends disposed toward the cylinder. Individual sheets are loaded onto the cylinder by operating the feed mechanism. In the B and C forms of the invention, the record sheets are manually loaded onto the form, the holes or adhesive strip serving to indicate which edge of the sheet should first be presented to the drum. Upon closing of the drive-energizing switch, the drum begins to rotate and the carriage to be translated relative to the drum at a speed determined by the operating speed of the motor and the design of the drive train. With 8½″ by 11″ sheets, I have found that from 10 to 30 lines per inch and a linear scanning speed of from 4 to 10 inches per second give an appropriate range of operating conditions. Scanning 20 lines per inch at about 5½″ per second on an 8½″ by 11″ sheet gives about 5 minutes of recording time.

To record, the gang switch is adjusted to the record position and the material to be recorded is spoken into the speaker-microphone after the closing of the solenoid-energizing switch. A record may be reproduced in exactly the same manner, except that the gang switch is adjusted to the reproduce position, inverting the amplifier connections and deenergizing the erase head.

One example of the flexibility and adaptability of the apparatus to office dictation work is to be found in the ease with which portions of a previously recorded message may be deleted and simultaneously replaced with new material. If a mistake has been made in dictation, the carriage is back spaced either semi-automatically or manually to a point somewhat in advance of the portion of the record bearing the material to be erased. The equipment is then adjusted for reproduction and the energizing switch closed until the last of the material which is to be retained is heard. At this point, the energizing switch is opened, the equipment readjusted for recording, the energizing switch is closed, and the correct material is spoken into the speaker-microphone. Since the erase head sweeps the track just in advance of the recording head, and since it is energized whenever the apparatus is adjusted for recording, the previously recorded material is obliterated and the erased track is immediately re-recorded with the new material. When, as is contemplated by the invention, the energizing switch takes the form of a foot switch, this cycle of erasing and redictating can be accomplished with great accuracy. For example, it is possible to remove as little as a single word and replace it with another word, and thereby produce a record which, upon reproduction, gives no evidence that it was not recorded consecutively. A further demonstration of the accuracy of alignment which is accomplished by the invention is the fact that even a record which has been removed from the machine may be reinserted for erasure and redictation in the manner above described.

From the foregoing it will be seen that according to the invention magnetic recordings are made in the form of what is effectively a single helical track upon foldable, creasible, rectangular sheets which have been flexed to cylindrical form. Upon removal and unflexing of the sheets, the single track is separated into fragments which may later be reassembled for continuous reproduction. Both the unflexing and reassembling may be accomplished semi-automatically, as in the A form of the invention, illustrated in Figures 4 and 5; or by manually propelling a sheet along a guided path, as in the B form illustrated in Figures 8 and 9; or, most simply, by manually propelling and visually guiding a sheet to a properly registered position, as described in connection with the C form of the invention, illustrated in Figures 12 and 13.

Certain features herein disclosed are described and claimed in my copending applications Serial No. 271,124, filed January 23, 1952; Serial No. 278,212, filed February 8, 1952; and Serial No. 297,379, filed July 5, 1952.

I claim:

1. A dictation machine comprising a creasible, flexible and limp rectangular nonmagnetic record sheet carrying dispersed magnetizable particles, a revolvable support adapted to carry the sheet in the form of a closed loop, the sheet being externally wrapped on the support, means for holding the sheet on the support with the leading edge portion driven with the support in substantially circumferential relation to the support, and with the trailing edge overlapping the leading edge with freedom for movement circumferentially of the support, and a magnetic scanning device yieldingly urged against a record sheet on the support, in a scanning path repeatedly crossing the overlapped edges of the sheet to provide for ironing out of any crease present in the record sheet intermediate the leading and trailing edges by movement of the trailing edge of the sheet circumferentially of the support.

2. A machine according to claim 1 in which the revolvable support comprises a member having a cylindrical record supporting surface about which the record is flexed to the form of a cylindrical loop, and in which the magnetic scanning device is yieldingly urged against a record sheet flexed about the cylindrical surface of said member.

3. A construction according to claim 1 and further including means for re-establishing alignment between portions of the path interrupted by the line of overlapping after removal of the record sheet and re-insertion in the same or similar machine, said alignment means comprising elements projecting radially from the surface of the support at opposite ends of the support at least in the region of overlapping of the leading and trailing edges of the sheet, said elements engaging the edges of the sheet lying adjacent the ends of the support when the sheet is wrapped thereon.

4. A dictation machine comprising a creasible and flexible nonmagnetic record sheet carrying dispersed magnetizable particles, said sheet having leading and trailing edges, a revolvable support adapted to carry the sheet in the form of a closed loop, controllable drive mechanism for revolving the support in one direction, the sheet being externally wrappable on the support with a trailing edge portion overlapping a leading edge portion with freedom for movement circumferentially of the latter portion and thus of the support, means for securing a leading edge portion of the sheet on the support in constant predetermined relation to the record supporting surface of the support, a magnetic scanning device yieldingly urged against the record sheet when on the support, and means for effecting relative movement between scanning device and support axially of the latter, so that said device when the support is revolved has an effective scanning path repeatedly crossing the overlapped edge portions of the sheet thereon, and the enforced flattening, by the scanning device, of any crease present in the record sheet intermediate the leading edge portion and the trailing edge is accommodated by movement of the trailing edge of the sheet circumferentially of the support.

5. A dictation machine comprising a creasible and flexible rectangular nonmagnetic record sheet carrying dispersed magnetizable particles, a revolvable support adapted to carry the sheet in the form of a closed loop, controllable drive mechanism for revolving the support in one direction, the sheet being externally wrapped on the support with the trailing edge portion overlapping the leading edge with freedom for movement circumferentially of the support, the support and the leading edge of the sheet being provided with interengageable fastening means providing for drive of the leading edge of the sheet with the support in substantially constant circumferential relation thereto, and a magnetic scanning device yieldingly urged against a record sheet on the support in a scanning path repeatedly crossing the overlapped edges of the sheet so that the enforced flattening of any crease present in the record sheet intermediate the leading and trailing edges by the scanning device is accommodated by movement of the trailing edge of the sheet circumferentially of the support.

6. A construction in accordance with claim 5 in which the interengageable fastening means provided on the support and on the record sheet comprise a hook and an eye provided respectively on said support and said sheet.

7. A dictation machine comprising a creasible and flexible rectangular nonmagnetic record sheet carrying dispersed magnetizable particles, a revolvable support adapted to carry the sheet in the form of a closed loop, controllable drive mechanism for revolving the support in one direction, the sheet being externally wrapped on the support with the trailing edge portion overlapping the leading edge with freedom for movement circumferentially of the support, the support and the leading edge of the sheet being provided with interengageable fastening means providing for drive of the leading edge of the sheet with the support in substantially constant circumferential relation thereto, the fastening means comprising elements interengageable and separable by relative movement toward and away from the surface of the support, and a magnetic scanning device yieldingly urged against a record sheet on the support in a scanning path repeatedly crossing the overlapped edges of the sheet so that the enforced flattening of any crease present in the record sheet intermediate the leading and trailing edges by the scanning device is accommodated by movement of the trailing edge of the sheet circumferentially of the support.

8. A dictation machine comprising a flexible, limp and creasible rectangular nonmagnetic record sheet carrying dispersed magnetizable particles, a rotatable drum on which the record sheet is externally wrappable, the drum having a circumferential dimension less than the dimension of the sheet in the direction of wrapping of the sheet on the drum to provide for overlapping of opposite edge portions of the sheet when the sheet is wrapped upon the drum, controllable drive mechanism for rotating the drum in a direction such that the outer lapped edge portion of the sheet is in trailing position, the leading edge portion of the sheet and the drum having cooperating interengageable fastening means providing for drive of the sheet with the drum in substantially constant circumferential relation, the fastening means cooperating with the leading edge portion only of the sheet and the remainder of the sheet from said leading edge portion to the trailing edge having freedom for movement circumferentially of the drum, and a magnetic scanning device and traverse mechanism therefor for shifting the scanning device axially of the drum when the drum rotates to provide for scanning a track having a multiplicity of turns each crossing the lapped edges of the sheet, the scanning device having yielding pressure contact with the sheet when wrapped on the drum and providing for smoothing or ironing out of the limp sheet from the leading edge portion to the trailing edge with each revolution of the drum.

BRUCE ROBERTS.

References Cited in the file of this patent

UNITED STATES PATENTS

| Number | Name | Date |
|---|---|---|
| 1,893,250 | Severy | Jan. 3, 1933 |
| 2,043,884 | Crudo | June 9, 1936 |
| 2,051,511 | Finch | Aug. 18, 1936 |
| 2,152,296 | Weis et al. | Mar. 28, 1939 |
| 2,229,293 | Huntley | Jan. 21, 1941 |
| 2,333,463 | Bryce | Nov. 2, 1943 |
| 2,378,388 | Begun | June 19, 1945 |
| 2,410,569 | Conant | Nov. 5, 1946 |
| 2,431,360 | Philpott | Nov. 25, 1947 |
| 2,435,260 | Wise et al. | Feb. 3, 1948 |
| 2,447,473 | Finch | Aug. 17, 1948 |
| 2,535,480 | Begun | Dec. 26, 1950 |

FOREIGN PATENTS

| Number | Country | Date |
|---|---|---|
| 541 | Great Britain | Nov. 2, 1903 |
| 611,840 | France | July 19, 1926 |
| 783,581 | France | Apr. 8, 1935 |
| 55,046 | Denmark | Aug. 1, 1938 |
| 55,552 | Netherlands | Oct. 16, 1943 |